UNITED STATES PATENT OFFICE.

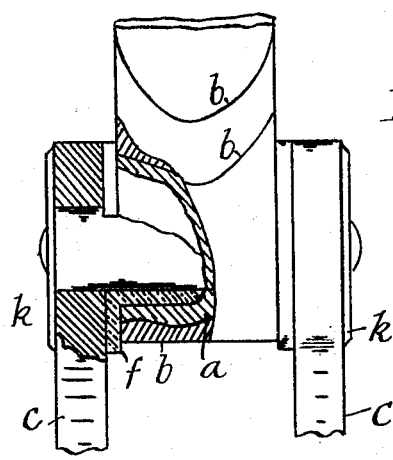
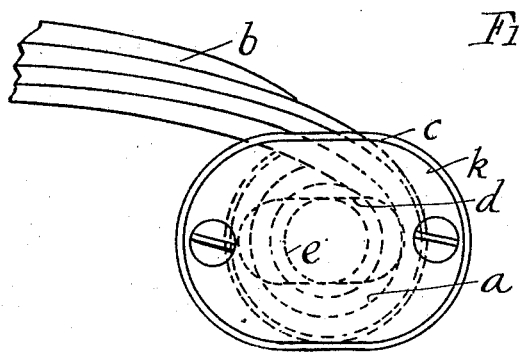

GEORGE EDWIN RIGBY, OF MANCHESTER, ENGLAND.

SPRING SUSPENSION.

1,327,063.     Specification of Letters Patent.     Patented Jan. 6, 1920.

Original application filed June 11, 1918, Serial No. 237,365. Divided and this application filed June 2, 1919. Serial No. 301,289.

*To all whom it may concern:*

Be it known that I, GEORGE EDWIN RIGBY, a subject of the King of England, residing at Manchester, in the Kingdom of England, have invented new and useful Improvements in Spring Suspensions, of which the following is a specification.

This invention relates to suspensions for laminated springs of the kind which compensate for the lengthening of the spring when in action, and my object is to provide a dust-proof roller bearing or suspension for the eye of said springs.

Hitherto this has been accomplished by shackles or links connected to the eye of the free end of the spring.

Other means have been applied to four-wheeled vehicles and motor cars in which the end, or ends, of bow-springs have been allowed to slide upon a friction plate, or the springs have been fitted with carrying rollers to slide in slots in the frame of a motor vehicle and on some motor vehicles, the ends of liminated springs have been provided with pins and rollers to move in guide slots on each side of the spring and same have been provided with protective nuts and washers.

The form and location of springs and the manner of guiding the ends thereof is not, however, a part of this invention, but its object is to provide improved means forming a roller bearing for the end of a laminated spring for insuring free extension of same under working conditions for which purpose I employ a hardened steel roller which passes through the eye of the spring, the roller being a working fit in the said eye.

The eye of the spring is first fitted between two plates which act as bearings, for same. The said plates having slots therein, one in each, the eye of the spring is placed between the said plates, and the steel roller is then passed through the side plates and the eye of the spring.

This accomplished, I then employ two caps which are made secure to the said side plates, one on each.

The said caps keep the roller in position and also make the bearings dustproof.

It will be seen that any movement of the spring will cause the said roller to roll along the said slots, while the eye of the spring is also free to turn upon the roller, and that the whole forms a dustproof suspension.

The invention will be readily understood by reference to the accompanying drawings, in which:—

Figure 1 is a part sectional front view, and Fig. 2 is a fractional side view of the improved spring suspension.

From these drawings it will be seen that the eye $a$ of the spring $b$ is fitted between the side plates $c$ which are each provided with a slot $d$ through which passes a steel roller $e$ engaging the eye $a$. A bushing $f$ may be used in addition if desirable. A dustproof cap $k$ is fitted at each side and serves to keep the roller clean and in position.

I claim:

The combination with a leaf spring having an eye in an end thereof, of means forming a roller bearing for said end comprising slotted side plates, a bushing in said eye, a roller in said bushing having its ends supported in the slots of said side plates, and caps secured to said side plates and covering the outer side of the slots therein to hold said roller in position and prevent the entrance of dust to said bearing.

GEORGE EDWIN RIGBY.